United States Patent
Milojicic et al.

(10) Patent No.: US 10,242,329 B2
(45) Date of Patent: Mar. 26, 2019

(54) METHOD AND APPARATUS FOR SUPPORTING A COMPUTER-BASED PRODUCT

(75) Inventors: Dejan S. Milojicic, Palo Alto, CA (US); Brian Cox, Galway (IE); Timothy F. Forell, Cupertino, CA (US); Alan G. Nemeth, Marlborough, MA (US); Peter Piet, Cupertino, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1413 days.

(21) Appl. No.: 13/260,244

(22) PCT Filed: Jul. 2, 2009

(86) PCT No.: PCT/US2009/049495
§ 371 (c)(1),
(2), (4) Date: Sep. 23, 2011

(87) PCT Pub. No.: WO2011/002462
PCT Pub. Date: Jan. 6, 2011

(65) Prior Publication Data
US 2012/0016705 A1    Jan. 19, 2012

(51) Int. Cl.
*G06Q 10/00* (2012.01)
*G06Q 10/06* (2012.01)
(Continued)

(52) U.S. Cl.
CPC .......... *G06Q 10/06* (2013.01); *G06Q 10/04* (2013.01); *G06Q 10/063* (2013.01); *G06Q 10/06375* (2013.01); *G06Q 30/016* (2013.01)

(58) Field of Classification Search
CPC ...... G06Q 10/06; G06Q 10/04; G06Q 10/063; G06Q 10/06375; G06Q 10/00; G06Q 40/06; G06F 17/60
(Continued)

(56) References Cited

U.S. PATENT DOCUMENTS 7,206,708 B2 *  4/2007  Williams .............. G06Q 10/06
                                                      702/170
7,620,565 B2 * 11/2009  Abelow ............... G06Q 10/101
                                                      705/500
(Continued)

FOREIGN PATENT DOCUMENTS

| EP | 1353283 A2 | 10/2003 |
|----|------------|---------|
| JP | 2004-240673 | 8/2004 |
| KR | 1020020065143 A | 8/2002 |

OTHER PUBLICATIONS

Funika et al "A Role-Based Approach to Self-healing in Autonomous Monitoring Systems", Dec. 2010, Institute of Computer Science, AGH, pp. 125-134.*
(Continued)

*Primary Examiner* — Romain Jeanty
(74) *Attorney, Agent, or Firm* — Trop, Pruner & Hu, P.C.

(57) ABSTRACT

A technique includes providing a cost model to predict a total cost for supporting a computer-based product system. The cost model predicts preventive, reactive and deferred components of the total cost. The technique includes determining features of the support and computer-based product system based at least in part on the cost model.

15 Claims, 10 Drawing Sheets

(51) Int. Cl.
*G06Q 10/04* (2012.01)
*G06Q 30/00* (2012.01)

(58) Field of Classification Search
USPC .................................................. 705/7.25
See application file for complete search history.

(56) References Cited

U.S. PATENT DOCUMENTS

| | | | | |
|---|---|---|---|---|
| 8,275,642 | B2* | 9/2012 | Chan et al. | 705/7.11 |
| 8,346,516 | B2* | 1/2013 | Misra | G06Q 10/00 703/2 |
| 8,423,397 | B2* | 4/2013 | Sitton | G06Q 10/04 705/7.12 |
| 2001/0032109 | A1* | 10/2001 | Gonyea | G06Q 10/06 705/400 |
| 2002/0072948 | A1 | 6/2002 | Iguti | |
| 2006/0253403 | A1* | 11/2006 | Stacklin et al. | 705/400 |
| 2007/0016432 | A1* | 1/2007 | Piggott | G06Q 10/06 705/7.37 |
| 2007/0043576 | A1* | 2/2007 | Kumamoto | G06Q 30/0283 705/400 |
| 2009/0048895 | A1* | 2/2009 | Hickey | G06Q 10/025 705/7.37 |
| 2009/0271255 | A1* | 10/2009 | Utter | G06Q 30/02 705/14.1 |

OTHER PUBLICATIONS

Asiedu et al "Product life cycle cost analysis: state of the art review", Dec. 1998, Department of Mechanical Engineering, University of Saskatchewan, Saskatoon, SK S7N 5A9, pp. 883-908.*
Pentaho Guide to Predictive Analysis for Bid Data) discloses a method for making predictive analysis, Dec. 2005, p. 1.*
Lapa et al (A model for preventive maintenance planning by generic algorithms based in cost and reliability); Mar. 2005; Reliability Engineering and Syste Safety; pp. 233-240.*
Niazi et L(Product Cost Estimation:Technique Classification and Methodology Review); May 2006, vol. 128; Journal of Manufacturing Science and Engineering; pp. 563-575.*
G.K (Optimum maintenance policy with Markov processes), Jul. 2005, Electric Power Systems Research, pp. 452-456.*
Schott et al "Design for Environment—Computer Based Product and Process Development", Dec. 1997, Life Cycle Networks, pp. 174-187 (Year: 1997).*
Feldmann et al Computer-based product structure analysis for technical goods regarding optimal end-of-life strategies, Dec. 2001; Institute of Manufacturing Automation and Production Systems, University of Erlangen-Nuremberg, Erlangen,Germany (Year: 2001).*
Korean Intellectual Property Office, International Search Report and Written Opinion for PCT/US2009/049495 dated Mar. 31, 2010 (11 pages).

* cited by examiner

METHOD AND APPARATUS FOR SUPPORTING A COMPUTER-BASED PRODUCT

BACKGROUND

The invention generally relates to method and apparatus for supporting a computer-based product.

Traditional computer-based products incur failures due to such events as parts failing; hardware and/or software being misconfigured; the hardware and/or software being complex; and the unpredicted behavior or use of the products in unplanned ways. These failures typically result in incidents, which are traditionally handled by call centers, customer engineers and parts replacement organizations. The traditional approaches for handling incidents have become significantly costly and complex, as information technology products are becoming increasingly complex and are ubiquitously being used in modern lives. Moreover, the incidents may be reported in an inconsistent way, which results in "noisy" data about the incidents being generated by the products; a lack of organized knowledge about incidents for the human operators at the call centers; and in general, the inability to plan and execute support for the products in a cost-effective manner.

DETAILED DESCRIPTION

It is inevitable that information technology (IT) products (i.e., computer-based products) may fail. As non-limiting examples, these products may include servers, storage in data centers, laptops, printers, personal digital assistants (PDAs), mobile telephones, etc. The failures may be attributable to materials and parts, misconfigurations, software bugs, incompatibilities, etc. In addition, products may not be used in the manner in which they were designed. A substantial amount of time, money and effort may be invested in the design for reliability; but incidents still happen, and as a result, the cost to alleviate them may be substantial, such as in the range of billions of dollars for an extensive suite of products.

Traditionally, the manufacturer of the product may establish a support network of call centers, customer engineers and parts to service the incidents. For purposes of reducing the service-related cost, various optimizations may be introduced. In this regard, products may be designed with increased redundancy or resilience to enable "self-healing," which means that the product at least temporarily diagnoses and fixes the problem that is caused by the incident. For example, a particular product may include redundant memory partitions, server blades, storage devices, etc., which allow the product to fail over to one of these redundant devices should the primary device fail. Self-healing may also be accomplished through, for example, software that downloads a patch or a replacement software module that is activated should a primary software module of the product fail. Other ways to decrease the costs that are associated with servicing incidents involve educating customers to enable self-mitigation and automating service delivery to reduce the amount of human engagement.

Figure 1:
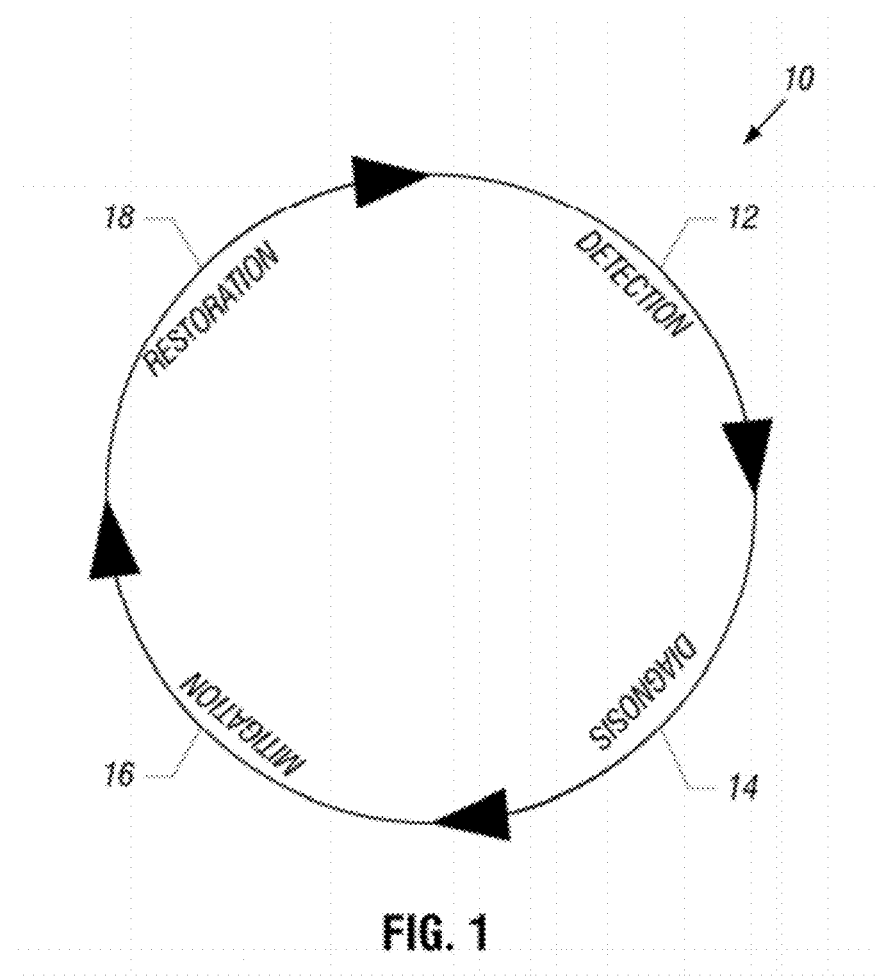
FIG. 1. is an illustration of an incident lifecycle according to an embodiment of the invention.

Referring to FIG. 1, in general, a life cycle 10 of an incident includes the following phases: a detection phase 12; a diagnosis phase 14; a mitigation phase 16; and a restoration phase 18. Historically, most automation has taken place in the detection phase 12, with some automation occurring in the mitigation 16 and restoration 18 phases. Automation in the diagnosis phase 14 has traditionally been the most difficult to automate. As described further below, incident service may be reactive, which means service occurs to repair or replace the defective component shortly after the occurrence of the incident; preventive, which means the service predates the incident; or deferred to a later time. Each approach may be automated or not.

Figure 2:
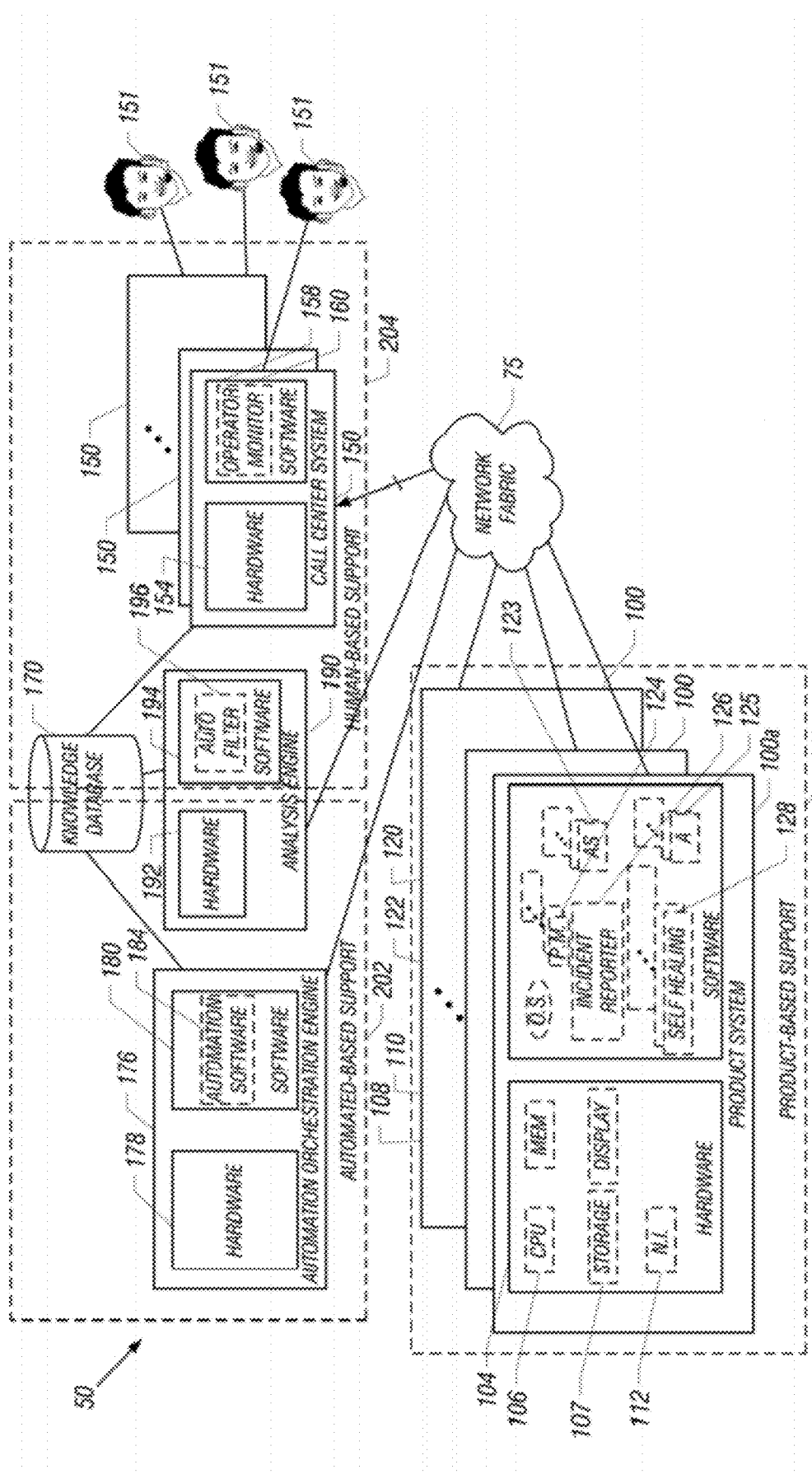
FIG. 2 is a schematic diagram of a service support network according to an embodiment of the invention.

Described herein are approaches that are directed to reducing the costs associated with servicing incidents and managing the service of the incidents. These approaches are described in connection with a service support network 50, which is depicted in FIG. 2. The service support network 50 has both automated and human-based, non-automated components.

More specifically, the service support network 50 includes various computer-based product systems 100 (i.e., exemplary "computer-based products"), which are in communication (via network fabric 75) with automated and human-based components of a support system. For this example, the product systems 100 are physical machines, such as laptops, desktops, storage centers, servers, etc., as non-limiting examples. It is noted that the product systems 100 may be a mixture of different types of supported products.

As examples, the network fabric 75 may contain various networks, such as a local area network (LAN), a wide area network (WAN), the Internet or any other type of communication link. It is noted that the network fabric 75 may include system buses or fast interconnects, which are not depicted in FIG. 2.

The product systems 100 may be used in a wide variety of applications, and, in general, each product system 100 may be used in a different application. Although three product systems 100 are depicted in FIG. 2 for purposes of example, it is understood that the product systems 100 may contain fewer or more than three physical machines, depending on the particular embodiment of the invention.

As further non-limiting examples, each of product systems 100 may be a computer, communication module or any other type of machine. In this regard, in the context of this application, each product system 100 is a "physical machine," which means that the machine is an actual machine that is made of software and hardware. Although each of the product systems 100 is depicted in FIG. 2 as being contained within a box, a particular product system may be a distributed machine, which has multiple nodes that provide a distributed and parallel processing system.

For an exemplary product system 100a that is depicted in FIG. 2, the product system 100a includes such hardware 104, as one or more central processing units (CPUs) 106, a memory 108, storage 107, a display 110, a network interface 112 and various other components, as can be appreciated by one of skill in the art. The product system 100 also includes software 120, which may include, as examples, an operating system 122, one or more preventive maintenance schedulers 124; one or more incident reporters 126 to automatically report incidents and obtain corresponding solutions to resolve the incidents; one or more self healing modules 128; one or more applications 125; and one or more application services 123; etc. Each of these software components, when executed by one or more of the CPUs 106, may cause the CPU(s) to perform certain functions related to the servicing of the product system 100a, as further described below. It is noted that the above-described hardware 104 and software 120 illustrate one out of many possible examples of configurations for the product system 100, as other and/or different configurations are contemplated in accordance with many possible embodiments of the invention.

When an incident occurs on a given product system 100, three types of support are available for handling the incident: product-based support 200 that is provided by the product system 100 itself; automated-based support 202 that is provided by an automated backend of a support entity (an entity established by the manufacturer, for example); and human-based support 204, which may also be provided by the support entity.

As an example, upon the occurrence of an incident, a given product system 100 may initiate a self healing operation (an example of the product support component), such as failing over to a redundant component of the system 100; or the given product system 100 may communicate with the support entity for purposes of prompting a diagnosis of the underlying problem and obtaining a potential solution to the diagnosed problem. If the product-based support 200 is not used or does not work, the incident is handled by the support entity. The communication with the support entity may involve some degree of human-based support 204 and/or some degree of automation-based support 202.

In accordance some embodiments of the invention, the service support network 50 on the support entity side includes various call center systems 150 (part of the human-based support 204), with each system 150 being associated, for example, with one or more human operators 151. In this regard, each call center system 150 may include hardware 154 and software 158, for purposes of allowing the human operators 151 to receive input data that describe symptoms of associated incidents describing the incident and allow the operators 151 to perform research (via a knowledge database 170, for example) for purposes of diagnosing the underlying problems and providing corresponding solutions to this problem. In accordance with some embodiments of the invention, the incident reporters 126 of the product systems 100 provide uniform reporting of the incidents so that incidents that share the same set of symptoms (i.e., the same type of incident) are automatically reported using the same incident reporting data. Therefore, uniform, "non-free" data describes the incident; and may be used for searches and logging of solutions in the knowledge database 170.

In addition to interacting with a human operator, a particular incident may be handled in an automated fashion by the automated support 202. In this regard, as further described below, in accordance with some embodiments of the invention, the support network 50 includes an automation orchestration engine 176 that processes incidents in an automated fashion. In accordance with some embodiments of the invention, the automation orchestration engine 176 may include hardware 178 (one or more CPUs, memory, etc.) and software 180, which is executed by one or more CPUs of the hardware 178 for purposes of automatically diagnosing an underlying problem that caused an incident reported by an incident reporter 126 and possibly presenting a solution to resolve the incident. In accordance with some embodiments of the invention, the automation orchestration engine 176 may access the knowledge database 170 for purposes of diagnosing the underlying problem and determining the solution to the problem.

Among its other features, the service support network 50 may also include an analysis engine 190, which automatically controls the routing of the incidents that are reported to the support entity so that each incident is handled by the automation support 202, the human support 204 or a combination thereof. As described further below, the analysis engine 190 considers certain incidents to be handled in an automated fashion, certain incidents to be handed using human input, and certain incidents to be handled in a semi-automated fashion; and the engine 190 routes the handling of these incidents accordingly.

The analysis engine 190, in general, contains hardware 192 (one or more CPUs, memory, storage, etc.) and software 194, which contains a filter 196 to select which incident reports are handled by the automation orchestration engine 176 and which incident reports are handled by the human-based call center system 150. In accordance with some embodiments of the invention, as described below, the analysis engine 190 monitors incident analyses by the human operators 151 for purposes of gradually automating these analyses and thus, transferring the handling of the automated incidents to the automation orchestration engine 176. Conversely, as described below, the analysis engine 190, in accordance with some embodiments of the invention, in response to relatively poor performance by automated methods, may transfer the handling of incidents to the human operators 151, and thus, may downgrade the handling of particular incidents from being automated to being handled by the human operators 151.

The specific mixture of the product-based 200, automation-based 202 and human-based 204 components of the service support generally affects the total cost of servicing a given product system 100. The optimum mixture, which results in the lowest service support cost for a given product system 100 may be a function of a number of parameters, including the geographic location where components are located, the specific features of the product system 100, etc.

Figure 3:
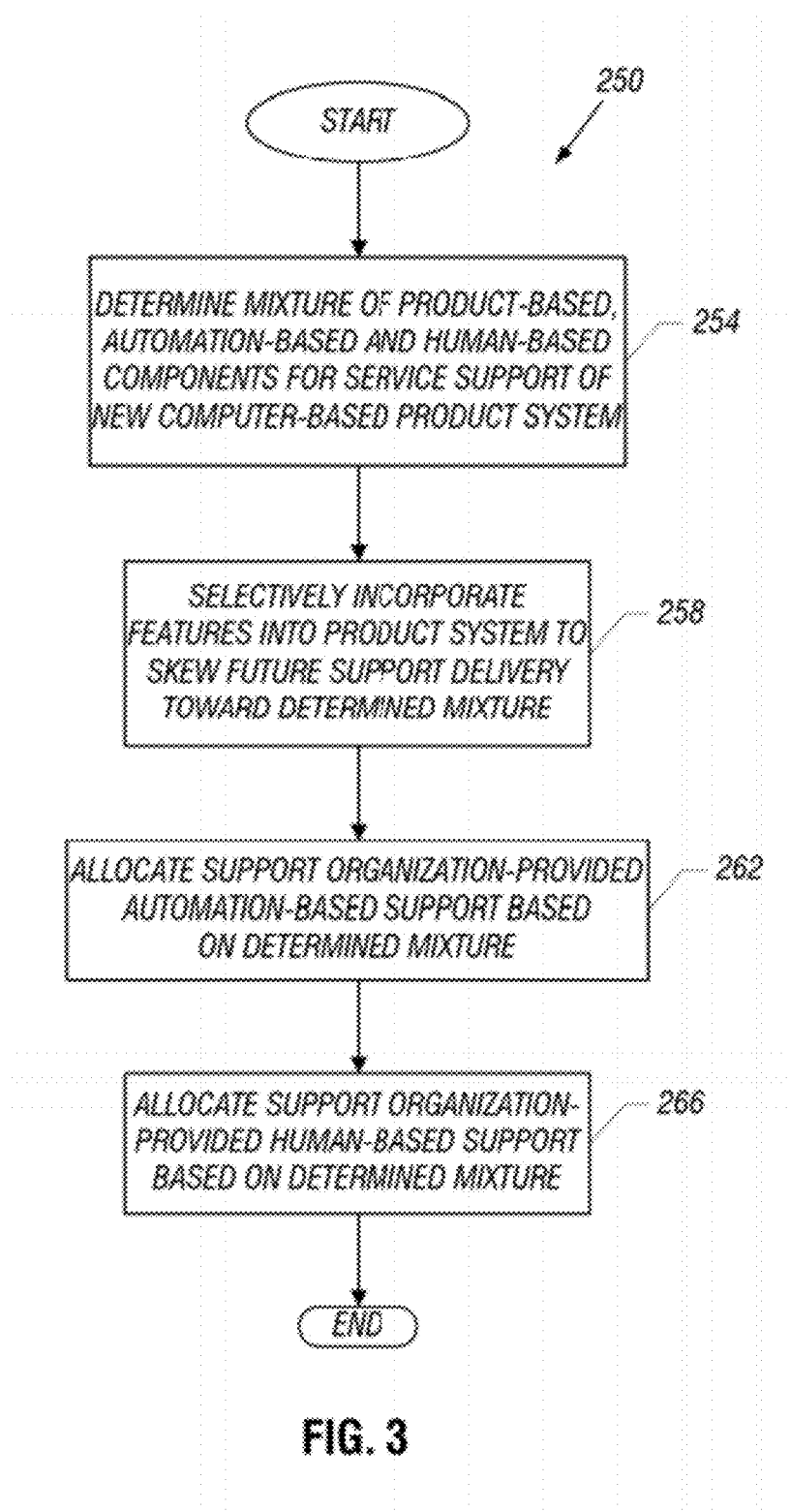
FIG. 3 is a flow diagram depicting a technique to design product, automation and human components of a service support network according to an embodiment of the invention.

Referring to FIG. 3 in conjunction with FIG. 2, in accordance with some embodiments of the invention, a technique 250 may be used for purposes of designing the product system 100 and support network 50 in general, so that the mixture product-based, human-based and automated-based service components is cost-optimized. More specifically, in accordance with some embodiments of the invention, the technique 250 includes determining (block 254) a mixture of product-based, automation-based and human-based components, which are used to support a new computer-based product. Based on this determined mixture, features are selectively incorporated into the product to skew the future support delivery toward the determined mixture, pursuant to block 258. Furthermore, based on this determined mixture, automation-based support is allocated (block 262) for the support organization based on the determined mixture; and additionally, the human-based support may be allocated, pursuant to block 266, based on this determined mixture.

As a more specific example, a particular computer-based product and the resources of the service support entity may be located in a geographic area that is associated with a relatively low cost of labor. Thus, for this scenario, the cost of using human operators to diagnosis incidents and provide corresponding solutions, as well as the cost to employ consulting product engineers are relatively low, as compared to the costs of investing significant resources into the product or into automated support. More specifically, for the relatively low wage labor market, human involvement is preferred, in that less resources are invested into the automated support and the various redundant components that may otherwise be installed in the product system 100.

Conversely, for an area with a relatively higher cost of labor, the mixture may be chosen to increase the automation-based support 202 and product-based support 200, while decreasing the level of human-based support 204. For example, for the latter scenario of a high wage market, the product system 100 may be designed with redundant memory partitions, redundant back planes, redundant drives, etc.; and a significant investment may be made in the automation-based support 202, as compared to the human-based support 204. As a result of this design, future support of the product is skewed toward the automation-based support 202 and product-based support 200 and skewed away from the human-based support 204. This is to be compared to the former lower wage market scenario, in which future product support is skewed toward the human-based support 204 and away from the automation-based 202 and product-based 200 support.

Figure 10:
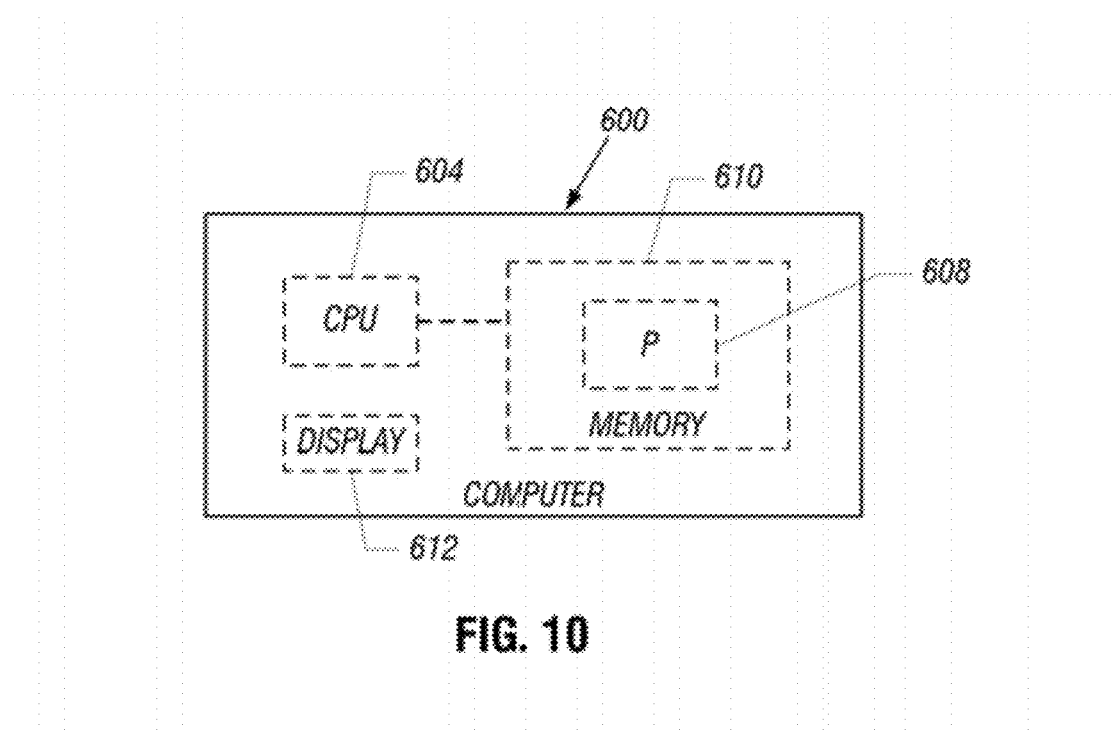
FIG. 10 is a schematic diagram of a computer system.

In accordance with some embodiments of the invention, the technique 250 may be performed at least in part by a computer 600 (see FIG. 10), which includes at least one CPU that executes software (stored as program instructions 608 in a memory 610 of the computer 600, for example) to identify features for the product system 100 based on various factors, such as labor costs, the cost of automated support services, the cost of redundant components, etc. The computer 600 may display the results of the technique 250 on a display 612 of the computer 600, for example.

In accordance with some embodiments of the invention, the service support that is provided by a support entity may be governed by a service level agreement (SLA). The SLA sets forth various aspects of the service to be provided by the support entity, and the SLA may be associated with penalty costs, which are attributed to SLA non-compliance.

In accordance with embodiments of the invention, the cost of supporting a given product system may be minimized through principles of risk management by decomposing the service support cost into preventive, reactive and deferred cost components. In this regard, as a non-limiting example, the total annual cost may be modeled as follows:

Total Annualized Cost=(ProbOfSLANon-Compliance)×(SLAPenaltyPerHour)×8760HoursPerYr+ (PredictNumOfSvcEventsPerYr)×(AvgCostPerSvcEventPerSvcContractType)+ AverageCostPerYrToDeploySpares (if any)   Eq. 1

In accordance with embodiments of the invention, in Eq. 1, continuous time Markov chains are used to evaluate the probability of not meeting the conditions that are specified in the SLA. The result is then combined with the SLA non-compliance penalty cost to generate the resulting annualized SLA non-compliance penalty cost. Next, an annualized service cost is determined by multiplying the number of predicted service events per year times the average service event cost, which corresponds to each of the types of service contracts offered. Additionally, the annualized cost of adding redundant components may be calculated. The total annualized cost may then be calculated by adding up the three types of costs indicated above. The total annualized cost may then be graphically displayed so that various tradeoffs between the preventive, reactive and deferred cost components may be analyzed for purposes of determining predicted cost for a targeted SLA.

Figure 4:
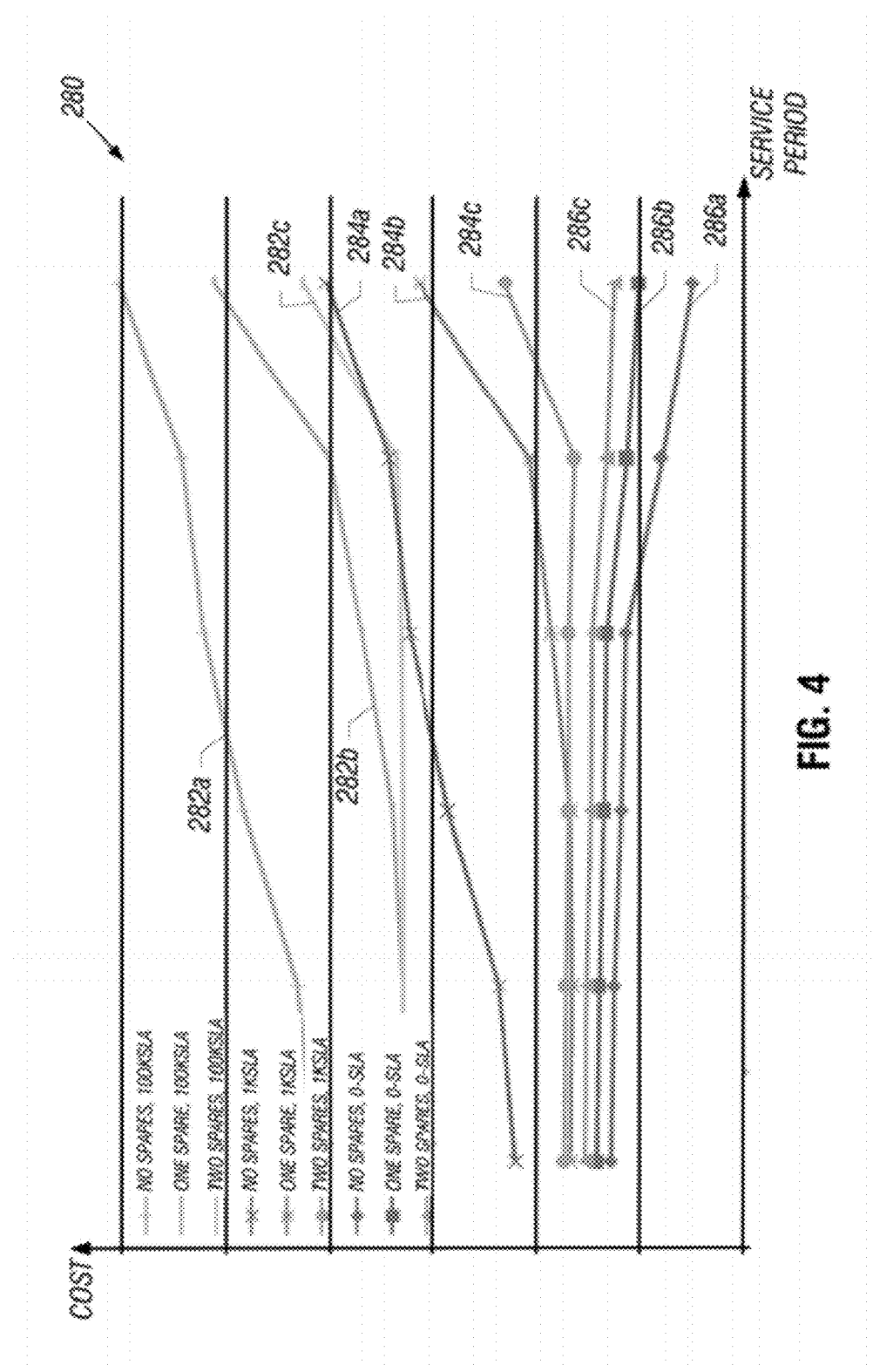
FIG. 4 is an illustration of graphs of the predicted cost versus service period for different service level agreements and product designs according to an embodiment of the invention.

As an example, FIG. 4 depicts an illustration 280 of a predicted total annual cost versus service period for no, one and two server blade spare configurations for a product system 100. Graphs 282a, 282b and 282c depict total annual costs for a relatively high SLA compliance penalty cost for no spares (282a), one spare (282b) and two spares (282c). As can be seen, for the relatively high SLA penalty cost, the total cost is minimized by incorporating two server blade spares into the product system 100.

For a relatively lower SLA penalty, graphs 284a (no spare), 284b (one spare) and 284c (two spares), illustrate that the total cost is also minimized using two redundant server blades. The last exemplary scenario depicted in FIG. 4 occurs when there is no SLA penalty cost. For this condition, the costs of the redundant server blades significantly affects the total cost. Thus, the lowest total cost is associated with the use of no spares, as indicated in graph 286a. This is to be compared with the total costs for one (graph 286b) and two (graph 286c) spares, respectively. As can be seen for this example, minimizing the total cost is a function of the SLA penalty cost and the cost of adding redundant components.

Additionally, the level of self healing components, as well as the cost associated with preventative maintenance may, or may not result in the lowest cost, depending on the particular SLA penalty cost. In general, changing redundancy levels may move appropriate repair actions for failure classes between different service approaches.

Figure 5:
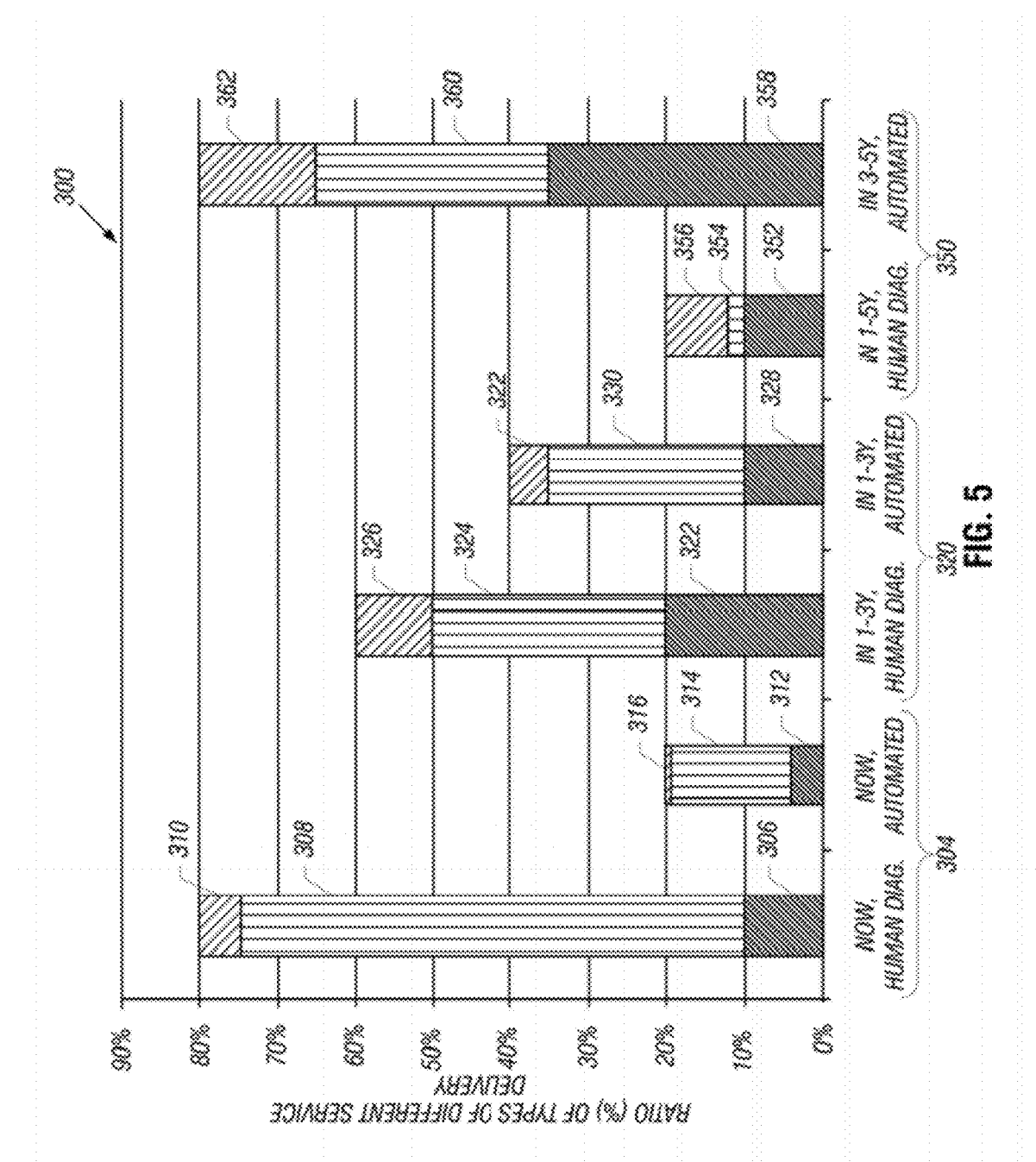
FIG. 5 is an illustration of present and future preventive, reactive and deferred components of service support automated and non-automated diagnoses according to embodiment of the invention.

FIG. 5 generally depicts an illustration 300 of the use of preventive, reactive and deferred components of service delivery. In particular, FIG. 5 depicts a scenario for a present day time frame 304, a time frame 320 for one to three years into the future; and a time frame 350 for three to five years into the future. As shown, presently, for a human diagnosis, the service delivery contains significant percentage of reactive service 308, as compared to the deferred 306 and preventive 310 services. This is also true in current automated service deliveries in which a significant portion is attributed to reactive service deliveries 314, as compared to deferred 312 and preventive 316 service deliveries.

In the one to three year time frame 320, it is predicted that the diagnosis may be pushed more toward the deferred service delivery. In this regard, for this time frame 320, for the human diagnosis, a larger percentage of service deliveries are deferred deliveries 322, and the remaining deliveries are preventive 326 and reactive 324 deliveries. The same increase in deferred service deliveries occur for the automated diagnosis for the time frame 320, as indicated by the deferred 328, reactive 330 and preventive 332 service deliveries.

In the future, in the three to five year time frame 350, the reactive component service delivery is projected to be the minimum component, and the deferred component is predicted to be the most prevalent. In this regard, for human diagnosis, most of the service delivery is predicted to be deferred 352, the smallest percentage is predicted to be reactive 324, and the remaining service delivery, preventive 356 service is predicted to fall in between. For automated diagnoses, the largest percentage is predicted to be deferred service delivery 358, with the remainder predicted to be preventive 362 and reactive 360.

It is also noted from the illustration 300 of FIG. 5 that the level of automated diagnoses is projected to increase over time, such that in the three to five year time frame 350, most of the diagnoses are predicted to be automated, as compared to the current trend in which most of the diagnoses are performed by human operators.

Figure 6:
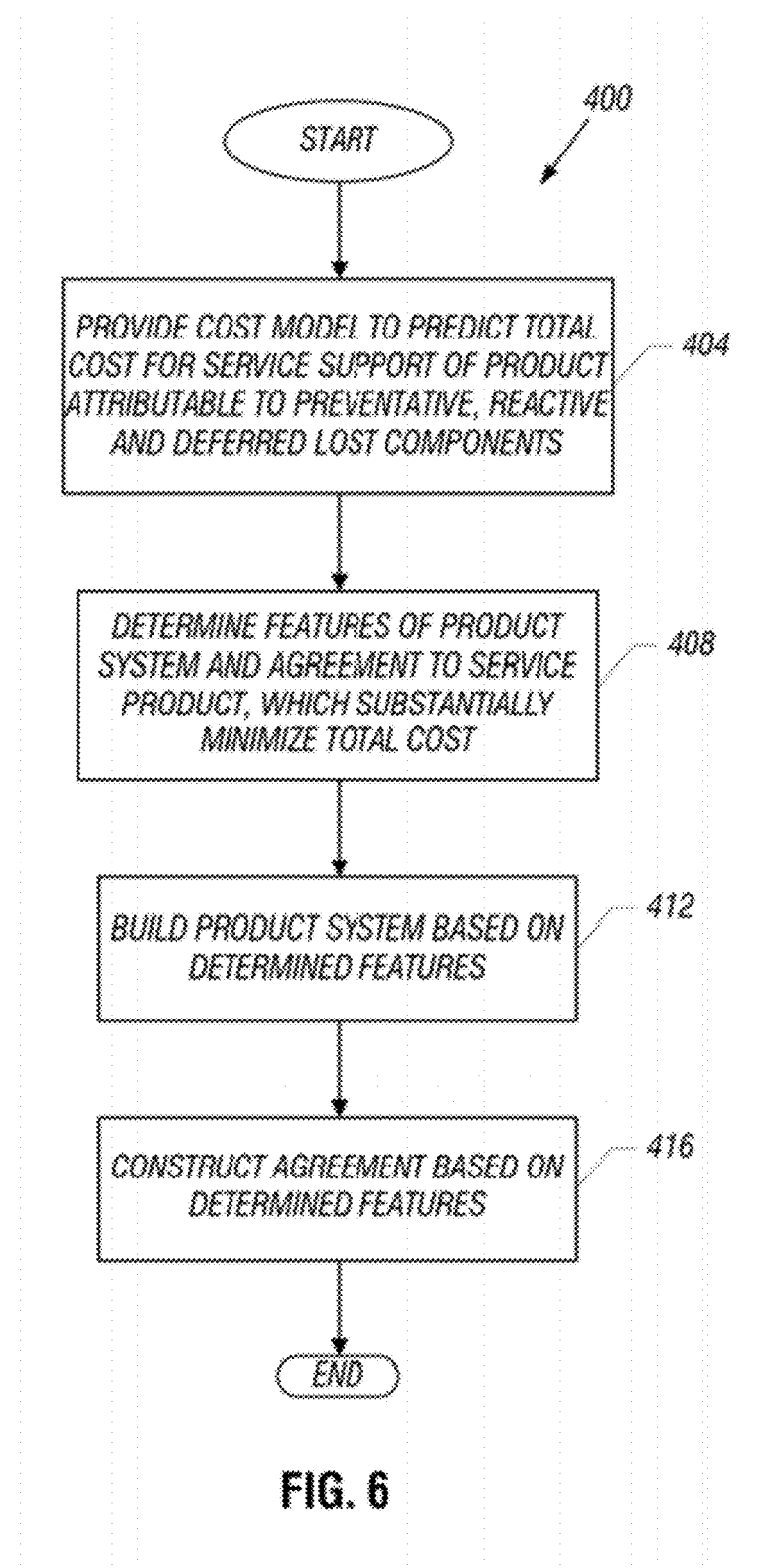
FIG. 6 is a flow diagram depicting a technique to design a service level agreement and a computer-based product to minimize costs associated with preventative, reactive and deferred components of service support of the product according to an embodiment of the invention.

Referring to FIG. 6, in conjunction with FIG. 2, in accordance with some embodiments of the invention, a technique 400 may be performed for purposes of determining features of a product system 100 and an SLA to service the product system 100 based on components of the total service support cost. It is noted that the technique 400 may be performed, for example, by a CPU executing software that is stored on a computer system, such as one or more CPUs 604 of a computer 600 (FIG. 10) executing program instructions 608 that are stored in a memory 610 of the computer 600, for example. Pursuant to the technique 400, a cost model is provided (block 404) to predict the total cost for supporting a computer-based product in terms of the preventive, reactive and deferred components of the total cost. Pursuant to block 408, features of the product and of the service agreement to service the product are determined, which substantially minimize the total cost. Based on these determined features, a product system may then be built (block 412), and furthermore, a service agreement may be constructed (block 416) based on the determined features.

In accordance with embodiments of the invention, knowledge may be transparently captured from human operators 151 (see FIG. 2) or users so that patterns may be identified for use in automatically advising operators of harmful actions. This allows for automatic preventive mitigations, such as alerts, or reactive mitigations.

The observed behavior of the human operators 151 may also be used to regulate which incidents may automatically or semi-automatically be diagnosed. More specifically, in accordance with embodiments of the invention, each call center system 150 includes an operator monitor 160, which observes the operator(s) 151 that are associated with the system 150 using rules, troubleshooting traces, pattern matching, etc., as just a few examples. The observation of the operators, coupled with the uniform incident-reporting data provided by the incident reporters 126, allow the identification of diagnoses that may be subject to automation.

Figure 7:
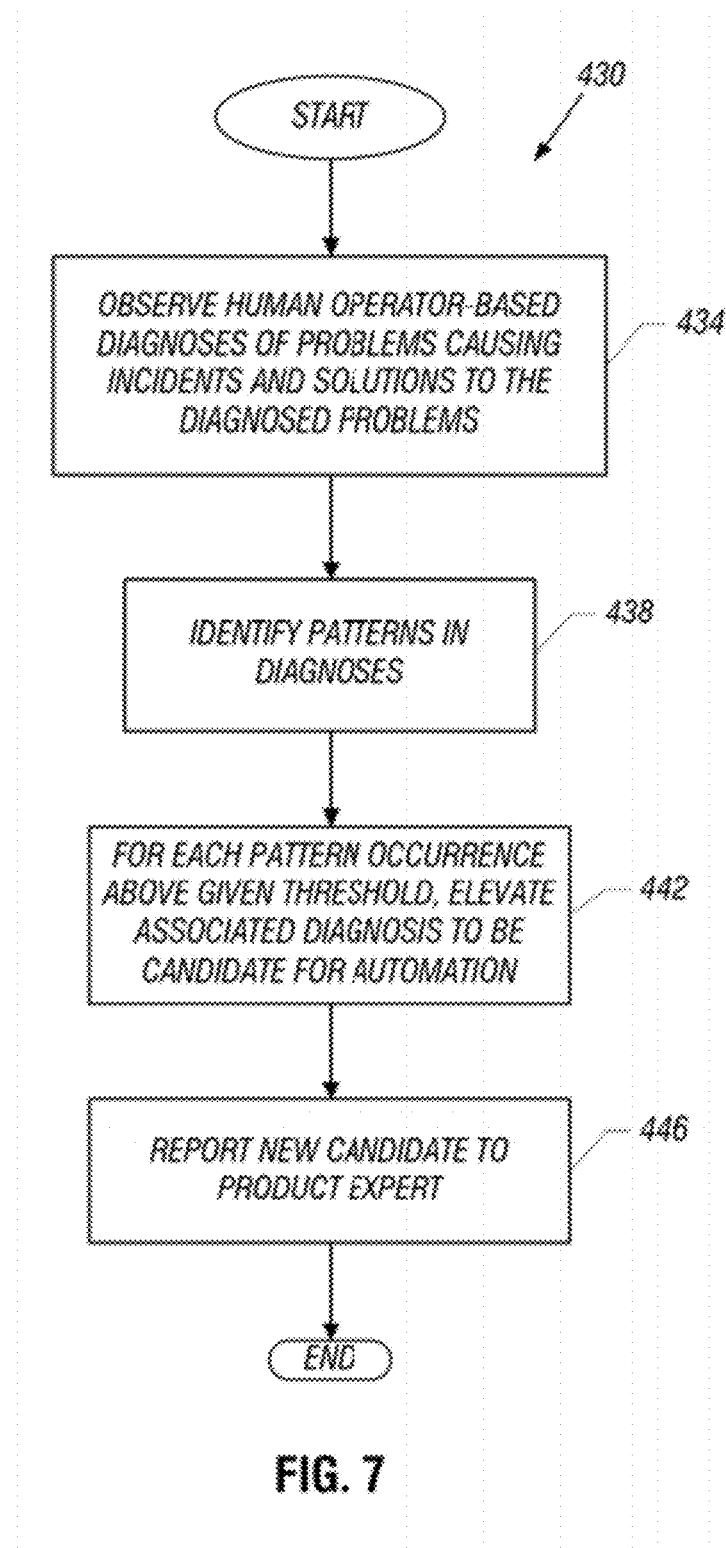
FIG. 7 is a flow diagram depicting a technique to select incidents as candidates for automation according to an embodiment of the invention.

More specifically, referring to FIG. 7 in conjunction with FIG. 2, in accordance with some embodiments of the invention, the analysis engine 190 (see FIG. 2) may perform a technique 430 that is depicted in FIG. 7 (via the CPU execution of the software 184, for example). Pursuant to the technique 430, the analysis engine 190 observes the actions taken by the human operators 151 related to diagnosing problems that cause incidents and possibly providing solutions to these diagnosed problems, pursuant to block 434.

Through interaction with the operator monitors 160, the analysis engine 190 is able to identify, pursuant to block 438, patterns in the diagnoses. Thus, due to the uniform input provided by the incident reporters 126 (see FIG. 2), the analysis engine 190 is able to identify when operators repeatedly diagnose the same problem for the same set of input data (i.e., for the same set of symptoms). When the analysis engine 190 determines that a particular pattern occurrence has surpassed a given threshold (block 442), the analysis engine 190 elevates the associated diagnosis to be a potential candidate for automation. In other words, the analysis engine 190 identifies the human-involved diagnosis and solution as being considered as to whether the diagnosis/solution should be moved to the automation orchestration engine 176. The candidate may be reported to a product expert at this time, pursuant to block 446.

As described further below, identification of a diagnosis as being a candidate does not necessarily mean that the diagnosis and solution are automated. Rather, by identifying a candidate, certain confidence levels may then be evaluated to determine if the candidate is appropriate for automation. Furthermore, depending on the particular embodiment of the invention, the candidate may not be fully automated even if certain confidence levels are surpassed, in that the analysis engine 190 may gradually automate the diagnosis/solution. In this regard, initially, after a certain confidence level is surpassed, the analysis engine 190 may automate a certain portion of the diagnosis/solution while still involving a human operator 151 or customer engineer. As the associated confidence level rises, the entire diagnosis/solution may eventually be automated and thus, be handled entirely by the automation orchestration engine 176.

It is noted that the identification of a diagnosis as being a candidate for automation may be performed by a human operator in accordance with other embodiments of the invention. In this regard, the human operator may identify a particular diagnosis as being a candidate for automation based on the nature of the diagnosis, a pattern observed by the human operator and/or other criteria. Thus, operators may create automated procedures and ad them to the overall environment, in accordance with some embodiments of the invention.

Figure 8:
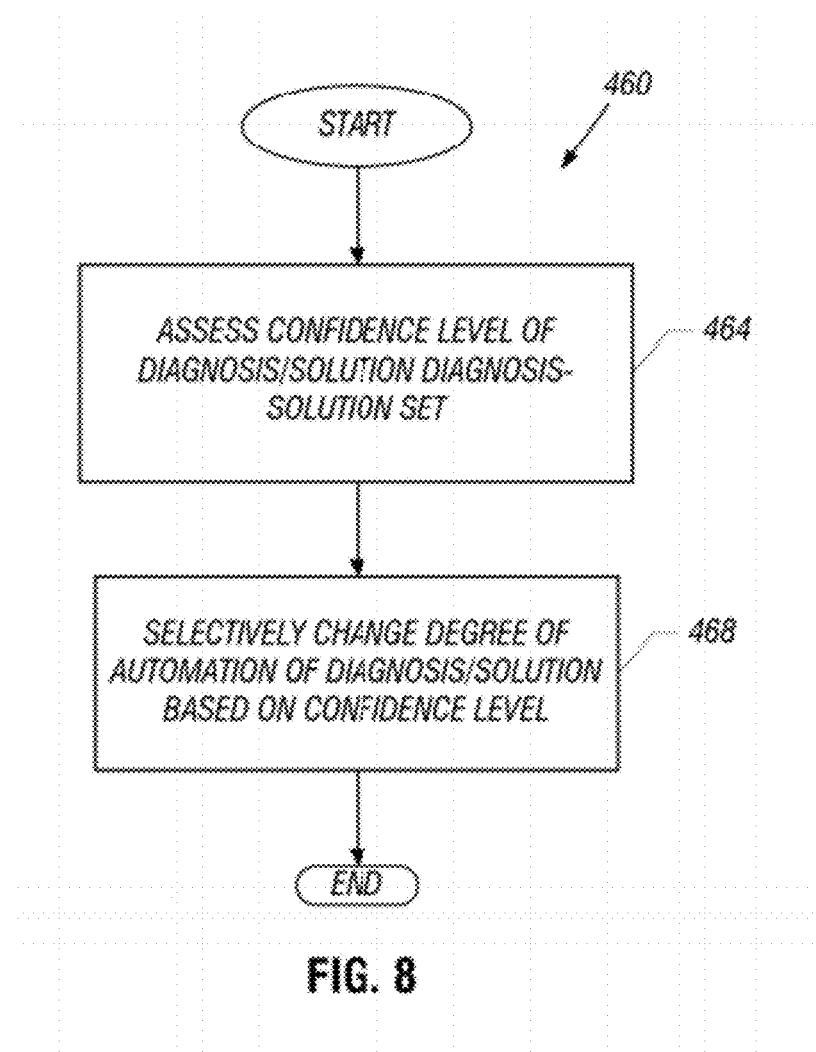
FIG. 8 is a flow diagram depicting a technique to assess the confidence level of a human-assisted diagnosis of an incident according to an embodiment of the invention.

Referring to FIG. 8 in conjunction with FIG. 2, in accordance with some embodiments of the invention, the analysis engine 190 performs a technique 460 to determine whether to automate the diagnosis/solution for an incident. Pursuant to the technique 460, the analysis engine 190 assesses (block 464) the confidence level of a given diagnosis/solution and selectively changes the degree of automation of the diagnosis/solution based on the confidence level, pursuant to block 468.

It is noted that the analysis engine 190 does not always necessarily increase the degree of automation. In this regard, in accordance with some embodiments of the invention, the analysis engine 190 may gradually decrease the automation level of a entirely or partially automated diagnosis/solution, should the associated confidence level significantly decrease. Other variations are contemplated and are within the scope of the appended claims.

Figure 9:
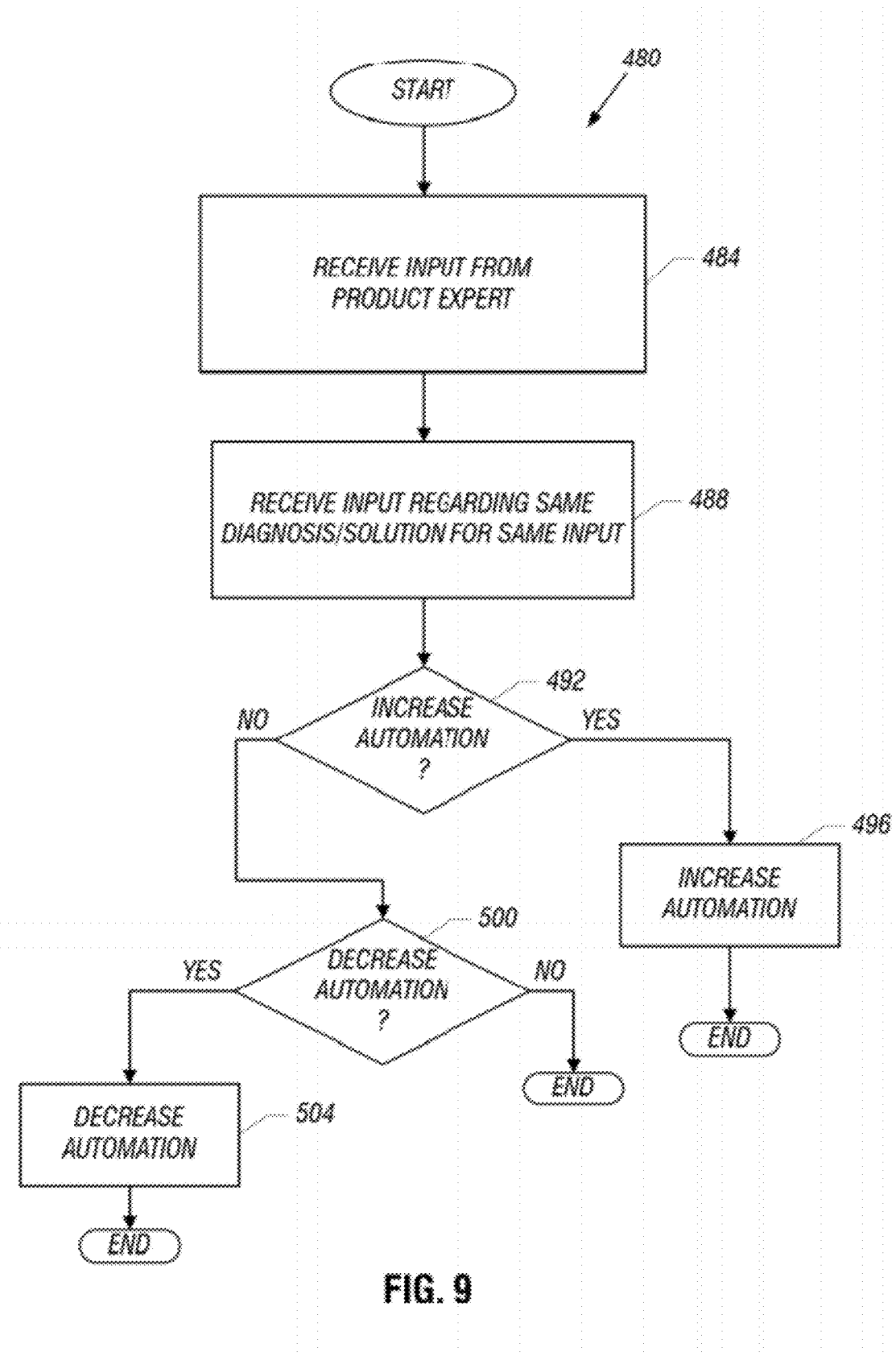
FIG. 9 is a flow diagram depicting a technique to adjust the degree in which the diagnosis of an incident is automated according to an embodiment of the invention.

Thus, referring to FIG. 9, in accordance with some embodiments of the invention, the automation engine 190 may perform a technique 480. Pursuant to the technique 480, such information as an input from a product expert (block 484), input regarding the same diagnosis and solution for the same incident by other human operators (block 488), etc. Based on these various indicators of confidence, the analysis engine 190 is able to derive a level of confidence for automation. Based on the measured confidence, the analysis engine 190 determines (diamond 492) whether the level of automation should be increased. If so, then the analysis engine 190 increases the automation, pursuant to block 496. Otherwise, the analysis engine 190 determines (diamond 500) whether the automation for the candidate should be decreased; and if so, the analysis engine 190 decreases the automation, pursuant to block 504.

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method comprising:
    processing data indicative of a cost model on a processor-based machine to predict a total cost for supporting a computer-based product system, the cost model predicting preventive, reactive and deferred components of the total cost;
    determining features of the support and computer-based product system based at least in part on the cost model, wherein features of the support comprise human based support and automated support provided by a processor-based automation orchestration engine;
    monitoring, by the processor-based machine, diagnoses for problems related to an incident and identifying a pattern in the diagnoses;
    evaluating a confidence level associated with the identified pattern; and
    regulating, by the processor-based machine, a portion of the diagnoses moved to the automation orchestration engine based on the evaluation of the confidence level; and
    displaying a graph to illustrate the preventive, reactive and deferred costs as a function of features of the computer-based product system and features of a service agreement.

2. The method of claim 1, wherein the act of determining the features comprises:
    substantially minimizing the total cost with respect to the features.

3. The method of claim 1, wherein the act of determining the features comprises:
    determining features of the service agreement.

4. The method of claim 1, further comprising:
    incorporating at least some of the features into the computer-based product system.

5. The method of claim 1, wherein the act of providing the cost model comprises estimating probabilities associated with components of the total cost.

6. The method of claim 1, wherein the act of determining features comprises at least one of the following:
    determining self-healing features to include in the product system;
    determining preventive maintenance features for the product system;
    determining redundant components of the product system; and
    determining a parts inventory for the product system.

7. The method of claim 1, wherein evaluating the confidence level comprises determining whether the confidence level surpasses a threshold level of confidence.

8. The method of claim 1, wherein regulating the portion of the diagnoses moved to the automation orchestration engine comprises increasing the portion of the diagnoses processed by the automation orchestration engine in response to the confidence level increasing.

9. The method of claim 1, wherein regulating the portion of the diagnoses moved to the automation orchestration engine comprises decreasing the portion of the diagnoses processed by the automation orchestration engine in response to the confidence level decreasing.

10. An article comprising a computer readable storage medium to store instructions that when executed by the computer cause the computer to:
    process data indicative of a cost model to predict a total cost for supporting a computer-based product system, the cost model to predict preventive, reactive and deferred costs to a support organization;
    determine features of the support and the computer-based product system based on the cost model, including the preventive, reactive and deferred costs, wherein features of the support comprise human based support and automated support provided by a processor-based automation orchestration engine;
    monitor diagnoses for problems related to an incident and identify a pattern in the diagnoses;
    evaluate a confidence level associated with the identified pattern;
    regulate a portion of the diagnoses moved to the automation orchestration engine based on the evaluation of the confidence level; and
    display a graph to illustrate the preventive, reactive and deferred costs as a function of features of the computer-based product system and features of a service agreement.

11. The article of claim 10, the storage medium storing instructions to cause the computer to apply Markov chains to predict likelihoods of incidents to predict the preventive, reactive and deferred costs.

12. The article of claim 10, the storage medium storing instructions to cause the computer to determine features of the service agreement to support the computer-based product system based on the predicted preventive, reactive and deferred costs.

13. The article of claim 10, the storage medium storing instructions to cause the computer to determine a degree of self-healing features to incorporate into the computer-based product system.

14. The article of claim 10, the storage medium storing instructions to cause the computer to determine a degree of redundancy to incorporate into the computer-based product system.

15. The article of claim 10, wherein the computer evaluates the confidence level by determining whether the confidence level surpasses a threshold level of confidence.

* * * * *